United States Patent
Balazs et al.

(10) Patent No.: US 9,930,752 B2
(45) Date of Patent: Mar. 27, 2018

(54) IMAGE SENSOR CONTROLLED LIGHTING FIXTURE

(71) Applicant: General Electric Company, Schenectady, NY (US)

(72) Inventors: Laszlo Balazs, Budapest (HU); Tamas Both, Budapest (HU); Jean-Marc Naud, Lachine (CA)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/937,408

(22) Filed: Nov. 10, 2015

(65) Prior Publication Data

US 2017/0135179 A1    May 11, 2017

(51) Int. Cl.
*H05B 37/02* (2006.01)
*H04N 5/232* (2006.01)
*H04N 5/335* (2011.01)
*G01V 8/12* (2006.01)

(52) U.S. Cl.
CPC ..... *H05B 37/0227* (2013.01); *H04N 5/23238* (2013.01); *H04N 5/335* (2013.01); *G01V 8/12* (2013.01); *Y02B 20/44* (2013.01)

(58) Field of Classification Search
CPC ............................. H05B 37/0227; G01B 8/12
See application file for complete search history.

(56) References Cited

U.S. PATENT DOCUMENTS

| | | | |
|---|---|---|---|
| 6,486,778 B2 | 11/2002 | Mahler | |
| 7,633,406 B2 | 12/2009 | Miki | |
| 8,710,746 B2 | 4/2014 | Takahashi | |
| 8,872,432 B2 | 10/2014 | Kercso | |
| 2008/0143273 A1* | 6/2008 | Davidson | H05B 37/0272 315/294 |
| 2011/0211110 A1 | 9/2011 | Doublet | |

(Continued)

FOREIGN PATENT DOCUMENTS

| | | |
|---|---|---|
| GB | 2489394 A | 10/2012 |
| KR | 1020120067616 A | 6/2012 |

(Continued)

OTHER PUBLICATIONS

GB Office Action issued in connection with corresponding GB Application No. 1618724.7 dated May 8, 2017.

(Continued)

*Primary Examiner* — Tung X Le
*Assistant Examiner* — Raymond R Chai
(74) *Attorney, Agent, or Firm* — Peter T. DiMauro; GE Global Patent Operation

(57) ABSTRACT

Methods and systems for controlling lighting fixtures independently with image sensors. In an embodiment, a luminaire includes a controller, an image sensor and wide-angle lens component, and a light source. The controller receives detection signal data from the image sensor and wide-angle lens component when a user is within a detection area associated with a view angle of the wide angle lens, and then determines the position of the user. The controller then controls the illuminance of the light source based on the position of the user. In particular, illuminance is increased as the user approaches a center portion of the detection area, and decreased as the user moves away from the center portion.

14 Claims, 4 Drawing Sheets

(56) References Cited

U.S. PATENT DOCUMENTS

| | | | |
|---|---|---|---|
| 2012/0206050 A1* | 8/2012 | Spero | B60Q 1/04 315/152 |
| 2012/0268034 A1* | 10/2012 | Karasawa | H05B 37/0272 315/297 |
| 2013/0241418 A1* | 9/2013 | Kercso | H05B 37/0227 315/152 |
| 2013/0241420 A1 | 9/2013 | Balázs | |
| 2013/0286204 A1* | 10/2013 | Cheng | H04N 5/33 348/148 |
| 2013/0342112 A1* | 12/2013 | Hidaka | H05B 37/0209 315/152 |
| 2014/0103814 A1* | 4/2014 | Both | H05B 37/0227 315/153 |
| 2015/0181679 A1 | 6/2015 | Liao et al. | |
| 2015/0208490 A1* | 7/2015 | Bishop | G08C 17/02 315/153 |

FOREIGN PATENT DOCUMENTS

| | | |
|---|---|---|
| WO | 2008135942 A1 | 11/2008 |
| WO | 2010100586 | 9/2010 |
| WO | 2011134003 A1 | 11/2011 |
| WO | 2014026226 A1 | 2/2014 |
| WO | 2014063201 A1 | 5/2014 |

\* cited by examiner

IMAGE SENSOR CONTROLLED LIGHTING FIXTURE

FIELD OF THE INVENTION

The present disclosure generally relates to lighting. More particularly, the present subject matter relates to methods and systems for controlling lighting fixtures with image sensors.

BACKGROUND

With regard to indoor spaces of large buildings (such as corridors and/or common rooms of apartment buildings and/or office buildings) and/or large outdoor spaces, it is often desirable to provide a lighting control system for controlling the light fixtures that illuminate such spaces to minimize or to reduce energy costs. Current lighting control systems use various means and/or devices to control the lighting in an area such as a corridor or room. For example, each of a plurality of light fixtures in a corridor may include one or more motion sensors operably connected to control circuitry configured to transmit data to, and receive instruction data from, a central location that controls the power consumed or supplied to each light fixture. Thus, centrally located lighting control systems can require the integration of sensors and lighting drivers into a dedicated analogue and/or digital communications system, which may be implemented, for example, by the digital addressable lighting interface (DALI) protocol. Installation of such a system often requires rewiring a building facility, which can be time-consuming, disruptive to operations, and expensive. In addition, after such a lighting control system is installed it must be maintained and/or monitored (and periodically upgraded), which can also be expensive and involve special expertise. Moreover, in some implementations the lighting control is not automatic and requires user input in order to control the luminosity in a room.

In some cases, lighting in an area can be remotely controlled, but then user input is required. Thus, the energy savings are not likely to be great. Motion sensors can also be used to control lighting in an area to save energy, but such a system is often characterized by abrupt On and Off cycles that do not provide continuous light to an area when a person is present, such as when the person is at a border of a detection area of one of the motion sensors. Therefore, while the use of a centrally located lighting control system, a remote lighting control system, or motion detector system can provide for some energy savings, it would be desirable to provide a lighting control system that provides a good trade-off between efficiency and user experience, that does not require rewiring of an area, that does not require expensive maintenance, and that does not have abrupt On and Off cycles.

SUMMARY OF THE INVENTION

Presented are apparatus and methods for controlling lighting fixtures independently with image sensors. In an embodiment, a luminaire includes a controller, an image sensor and wide-angle lens component, and a light source. The controller receives detection signal data from the image sensor and wide-angle lens component when a user is within a detection area associated with a view angle of the wide angle lens, and then determines the position of the user. The controller then controls the illuminance of the light source based on the position of the user. In particular, illuminance is increased as the user approaches a center portion of the detection area, and decreased as the user moves away from the center portion.

Another embodiment concerns controlling the illumination of an area. The method includes monitoring, by a plurality of independent luminaires, a predefined area for a presence of at least one user. Each luminaire of the plurality of luminaires includes a controller, an image sensor and wide-angle lens component, and a light source. The process includes detecting, by each of the plurality of independent luminaires, a user in the area and then independently controlling the illuminance of each light source of the plurality of luminaires. The illuminance of each light source is controlled by its controller based on a detection signal data from the image sensor and wide-angle lens component, wherein when the detection signal data indicates that the user is approaching a center portion of the luminaire's detection area the controller controls the light source to increase illuminance, and wherein when the detection signal data indicates that the user is moving away from the center of the detection area the controller controls the light source to decrease illuminance.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments (not necessarily drawn to scale), wherein.

DETAILED DESCRIPTION

Figure 1:
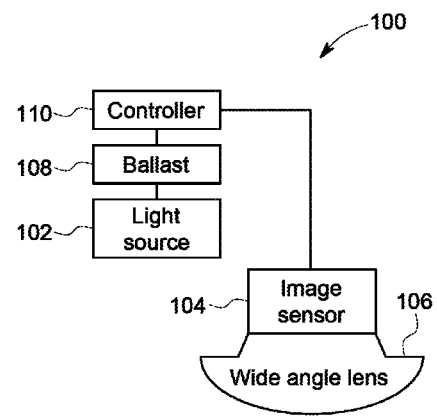
FIG. 1 a block diagram of a lighting fixture that can be a component of a lighting control system according to an exemplary embodiment of the disclosure.

Reference now will be made in detail to illustrative embodiments, one or more examples of which are illustrated in the drawings. Each example is provided by way of explanation and thus does not limit the invention. In fact, it will be apparent to those skilled in the art that various modifications and/or variations can be made without departing from the scope or spirit of the invention. For instance, features illustrated or described as part of one embodiment can be used with another embodiment to yield a further embodiment. Thus, it is intended that the present disclosure covers such modifications and variations as come within the scope of the appended claims and their equivalents.

Embodiments described herein are directed to a lighting fixture or luminaire, a lighting system, and methods for controlling the illumination of an area and/or areas. The lighting system can include a plurality of luminaires or lighting fixtures, each of which having at least one image sensor and associated wide-angle lens (typically called a "fisheye" lens) component, which in some implementations has a viewing angle of between one hundred degrees (100°) to nearly one hundred and eighty degrees (180°). In some implementations described herein, an image sensor and wide-angle lens component may have a viewing angle of about 165°, but it should be understood that other embodiments may include a plurality of luminaires that each has a viewing angle within the range of from about 160° to approximately 175°. Each such luminaire also includes at least one light source which may consist of, for example, one or more light-emitting diodes (LEDs), and a controller. In some embodiments, the view angle of the image sensor and wide-angle lens component is significantly larger than the illumination area of the light source of the luminaire. Such a luminaire is suitable for use as a large area lighting fixture, such as recessed or exposed luminaire in a low or high ceiling application that provides light downwardly to directly impact lighting ambience and/or visual appeal. Thus, a plurality of such down light luminaires may enhance lighting in an open format office space, in a conference room, in a reception area, in a corridor of an office building or apartment building, in a parking lot, in a courtyard, and/or along an outside pathway.

In some embodiments, each image sensor and wide-angle lens component is configured to detect the presence of a user in a detection area associated with the luminaire, and sends a signal or signals to the controller of the luminaire to allow for automated control of the emitted light from the light source as a response to changes in the environment. In particular, the wide-angle optics (e.g., fisheye lens) distorts detected shapes, and the distortion increases outwardly from a center point of the detection area of the luminaire towards a periphery of the detection area. As a result of such distortion, the imaging sensor can only detect large displacements (or gross movements) on the periphery of the detection area (far away from the center point) but can detect small movements, such as user hand movements, in the proximity of the lens axis (which is closest to the lens, or directly below the image sensor and wide-angle lens component). Therefore, the image sensor and wide-angle lens component can function both as presence sensor and as a motion sensor with regard to users near or in the center of the detection area, but only as a motion detector concerning users in the periphery or outermost portions of the detection area. It should be understood that the term "users" may refer to persons and/or vehicles and/or animals and/or any other ambulatory objects. In some described embodiments, for ease of understanding a user refers to a person. Thus, the resolution of the image produced by the image sensor near the center of the detection area is high enough to detect the presence of a person because identifying events or actions such as hand gestures, the user turning his or her head, and the like, can be discerned. However, the resolution of the image produced by the image sensor and wide angle component from near the periphery of the detection area is low because small movements and/or image data changes may be in the subpixel domain. Therefore, the image data obtained from the periphery of the detection area cannot be identified (but the image sensor can still function as a motion detector). Accordingly, in some implementations the controller is configured to vary the level of illumination emitted from the light source of the luminaire to increase as a user approaches the center of the detection area, and to decrease as the user moves away from the center of the detection area towards the periphery. Thus, in some embodiments, the sensor and wide-angle lens component transmits multiple signals to the controller indicating which portion(s) of the detection area of the luminaire are occupied by one or more users.

FIG. 1 is a block diagram of a light fixture 100 for dynamic lighting control in accordance with the present disclosure. The light fixture 100 includes a single light source 102, but it should be understood that embodiments having more than one light source are contemplated. The light fixture 100 also includes an image sensor 104 coupled to a wide angle lens 106, a ballast 108 and a controller 110. The light source 102 may be, for example, a fluorescent light source (such as a linear fluorescent tube or a compact fluorescent light bulb or CFL), one or more light-emitting diodes (LEDs), a combination of fluorescent tubes and LEDs, or any other suitable light source. The ballast 108 is operably connected to the light source 102, and operates to stabilize the current to provide the proper power (or to regulate the power) provided to the light source 102. Such a light source 102 can be manufactured, shipped and/or sold separately from the lighting fixture 100, and in some embodiments is removably coupled with the controller 110, for example, via wiring, drive circuitry and/or a light socket (not shown) that receives an end of the light source 102. In some other implementations, however, the light source is integrated into the luminaire and may not be removably coupled to the controller, for example. Referring again to FIG. 1, the luminaire 100 can be one component of a lighting control system that includes a plurality of luminaires, wherein each luminaire operates independently of its neighbor.

Figure 2:
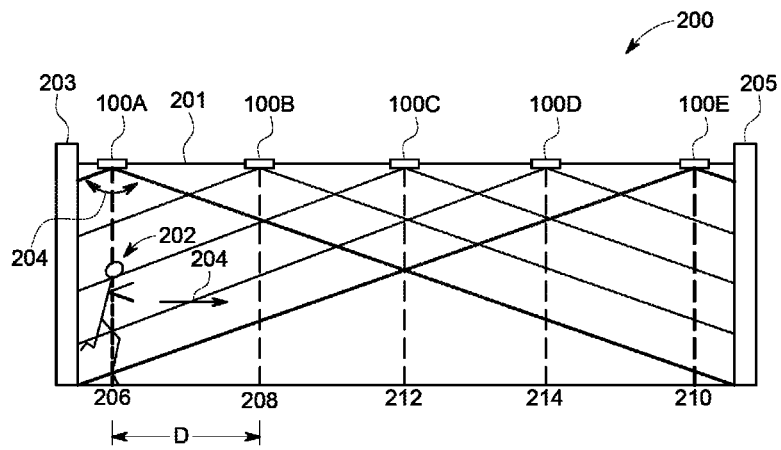
FIG. 2 illustrates an embodiment of a lighting system including a plurality of independent light fixtures or luminaires in accordance with embodiments of the disclosure.

FIG. 2 illustrates an embodiment of a lighting system 200 including a plurality of light fixtures 100A, 100B, 100C, 100D and 100E in accordance with embodiments described herein. The light fixtures 100A, 100B, 100C, 100D and 100E may, for example, be positioned in a ceiling 201 for lighting a room of a building having a first side wall 203 and a second side wall 205. Each light fixture 100A-100E may include components described above with regard to the light fixture 100 of FIG. 1, including an integrated image sensor and wide-angle lens component and a controller, and may operate in accordance with processes described herein. In particular, in the example lighting system 200 each luminaire or light fixture 100A-100E has a viewing angle 204 of about 140° which guarantees a detection area that encompasses the entire room from the first side wall 203 to the second side wall 205 (and from the front and rear walls, which are not shown for ease of understanding). It should be understood that the 140° viewing angle is used herein for ease of understanding the drawing, and that in some practical implementations a wider viewing angle of the image sensor and wide-angle lens component, such as a viewing angle of approximately 165°, can be utilized. Thus, with regard to the example shown in FIG. 2, each luminaire can detect a user moving anywhere within the confines of the room to at least some extent.

Referring again to FIG. 2, each luminaire 100A-100E is configured to independently adapt to the actual occupancy or movement of people or users detected in the space or room. As shown, the detection areas of adjacent luminaires significantly overlap due to the wide-angle lens being used in each sensor and wide-angle lens component, and in this embodiment each image sensor and wide angle lens component (including the sensor element and wide angle lens component in the luminaire 100C which is in the center of the room) is capable of detecting movement in the entire space (or room), but each from a different position. The individual luminaires do not communicate with any of their neighbor luminaires, and therefore when a user 202 walks in the direction of arrow 204 it is detected by the image sensor and wide angle component of the luminaire 100A and each of the other image sensor and wide angle lens components of each of the other luminaires 100B to 100E. As shown, the user 202 is at or near the center 206 of the detection area of the luminaire 100A, and thus it is identified by the controller (not shown) of the luminaire 100A as a user (in this case a person). In addition, because the user 202 is near the center 206 of detection area, the image sensor and wide-angle lens component of the luminaire 100A can detect small movements of the user (such as hand or finger movements). With regard to the luminaire 100B, the user 202 is a distance "D" away from the center line 208 and thus the image sensor and wide-angle lens component of the luminaire 100B may only be able to detect or distinguish leg or arm movements of the user. Accordingly, because the user 202 is far away from the center line 210 of the luminaire 100E and thus at or near the periphery of the detection area of the image sensor and wide angle lens component of that luminaire, then the image sensor and wide-angle lens component of the luminaire 100E may only be able to detect or distinguish gross movements of the user. In an implementation, the controller causes the light source (not shown) of luminaire 100A to increase the lighting level to a preselected maximum value of illuminance. As the user 204 continues in the direction of arrow 204 and away from the center 206 the controller of luminaire 100A causes the light source to gradually decrease the lighting level or light intensity to a preselected minimum value.

Referring again to FIG. 2, it should be recognized that due to the user 202 is being at the center 206 of the luminaire 100A and a distance "D" from the center 208 of the luminaire 100B, the image sensor and wide angle lens component of the luminaire 100A will send one or more signals to the controller to cause the light output of the light source to be maximized, whereas the sensor and wide angle lens component of the luminaire 100B will send one or more signals to the controller of the luminaire 100B to cause the light output or illuminance of the light source to be at a somewhat lesser value than the maximum amount. But as the user 202 moves in the direction of the arrow 204 away from the center 206 and towards the center 208, the sensor and wide angle lens component of the luminaire 100B will send one or more signals to the controller of the luminaire 100B to cause the light output of its' light source to increased, while the sensor and wide angle lens component of the luminaire 100A will send one or more signals to the controller of the luminaire 100A to cause the light output of its' light source to be decreased. Likewise, as the sensor and wide angle lens component of the luminaire 100E detects gross movements or motion of the user 202 in the periphery area, it sends one or more signals to the controller of the luminaire 100E which causes the light source to gradually increase light output from an Off state (or from a minimum state of illuminance) to a predetermined value, which may be the maximum level of illuminance when the user arrives at the center 210. Accordingly, in FIG. 2 the luminaire 100A may be fully illuminated whereas the luminaire 100B may be illuminated at a slightly lower amount of luminance, and whereas the luminaire 100E may be illuminated to a much lower level of luminance.

In some embodiments, the sampling rate of the image sensor and wide angle lens component and controller of the luminaires 100A-100E, along with the control actions (to increase or decrease light output), is not significantly slower than human perception (for example, the sampling rate may be greater than one Hertz (1 Hz)). Thus, in some embodiments, the image from the wide angle lens and image sensor component is refreshed at the rate of approximately one hertz to determine whether or not movement occurred. Again referring to FIG. 2, as the user enters the periphery of the detection area of the luminaire 100E, the controller of the luminaire 100E gradually increases light output from its light source from an Off state (or from a minimum state of illuminance) to a predetermined value. This process continues with the luminaires 100C, 100D and 100E each increasing and/or decreasing the illumination of their light sources as the user moves in the direction of arrow 204 to move towards, into and out of the respective center portions 206, 208, 212, 214 and 210. In this manner, the lighting adapts to the actual movement of the user 202 as the user moves in the direction of arrow 204 (or otherwise moves about the room) so that the room is illuminated in front of and around the moving user and then the light output is decreased as the user passes or moves away from a luminaire, to save on energy costs. Accordingly, as shown in FIG. 2, the detection areas of the image sensor and wide angle lens components of the luminaires 100A-100E significantly overlap, and thus the lighting system 200 continuously adapts to the presence and motion of the users about the area covered by the image sensors. It also should be understood that the luminance distribution emerging from the individual luminaires is self-organized because there is no communication between the luminaires, and that daylight harvesting can be incorporated (as explained hereinafter) and the concept extended to create an anonymous surveillance and/or security system.

Figure 3A:
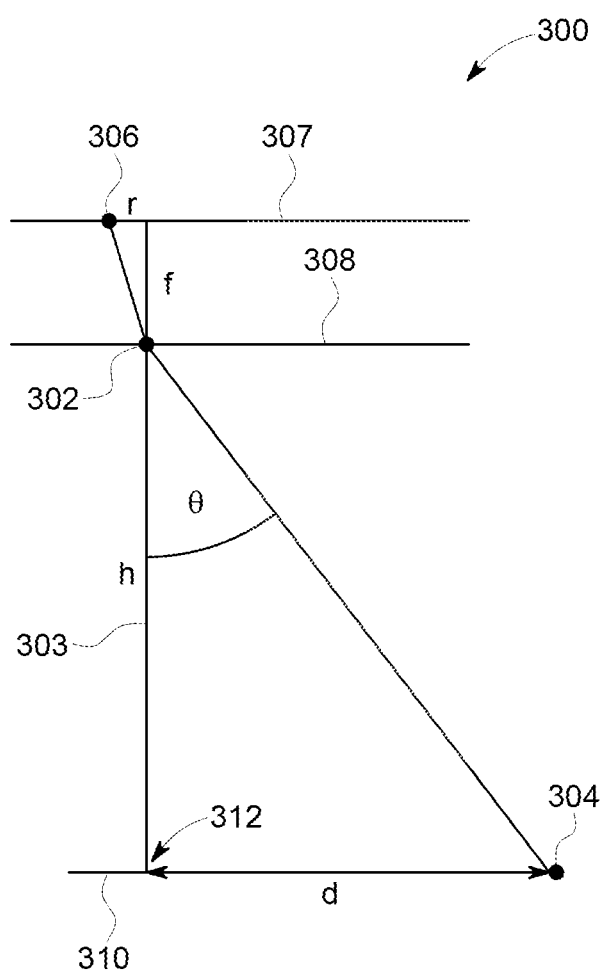
FIGS. 3A-3C depict graphs that illustrate the distortion and image resolution of a suitable image sensor and wide angle lens component for use in a luminaire in accordance with the disclosure.
Figure 3B:
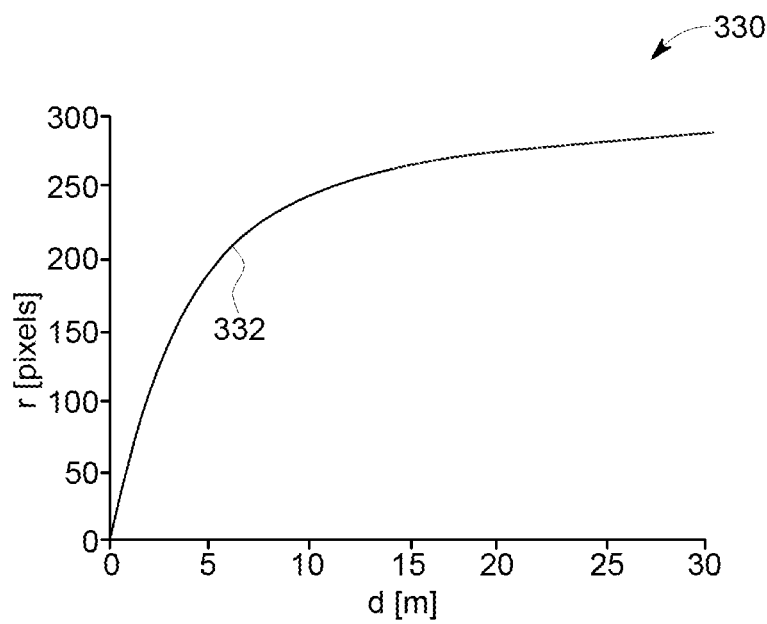
Figure 3C:
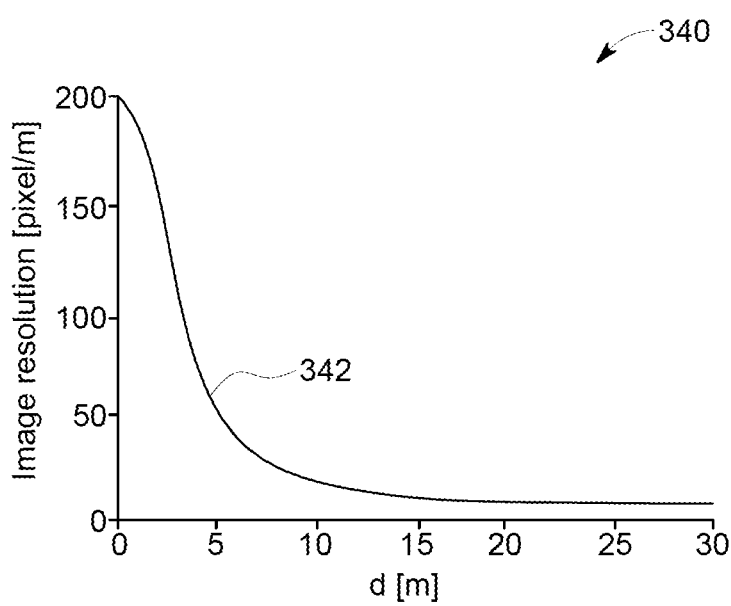

FIGS. 3A-3C depict graphs that illustrate the distortion and/or image resolution of a suitable image sensor and wide angle lens component for use in a luminaire in accordance with the disclosure. Referring to FIG. 3A, the graph 300 depicts an optical center 302 of the wide angle lens which is located at a ceiling plane 308. The image plane 307 of the image sensor is located at the focal length "f" of the wide angle lens located at the ceiling plane 308. The term "r" represents the distance from the center of the image appearing on the image sensor (at the image plane 307) of an object that is located at object point 304 on an object plane 310. The term "d" represents the distance from the center 312 of the image detection area to the object point 304 on the object floor 310, and the term "h" is the height or distance between a ceiling plane 308 to the object floor 310. In an embodiment, the focal length of the wide angle or fisheye lens is three millimeters (f=3 mm), the pixel size is fifteen micrometers (15 μm), and the height (h) of the image sensor and wide angle lens component above the object plane is three and a half meters (3.5 m). In such an embodiment, in the center 312 of the image detection area more than one hundred (100) pixels represent a one meter (1 m) length on the object plane 310, but on the periphery 304 of the image detection area the resolution of the image sensor and wide angle lens component may be on the order of only one meter per pixel (1 m/pixel).

FIG. 3B is a graph 330 of the distortion of a wide angle lens of the type suitable for use in an image sensor and wide angle lens component according to an embodiment. The curve 332 illustrates that as the distance "d" increases from zero, the value "r" increases quickly which provides a distorted image on the image plane 307 of FIG. 3A. Similarly, FIG. 3C is a graph 340 of the image resolution as a function of the object distance from the optical axis. The curve 342 illustrates that as the distance "d" increases from zero (as the object moves away from the central axis of the wide angle lens) the image resolution falls dramatically from a high of about two hundred pixels per meter (200 pixel/m) to approaching zero pixels per meter at a distance of about thirty meters (30 m) from the optical center. Accordingly, referring to FIG. 3A, near the center 312 of the image detection area, the resolution is high enough to detect the presence of a person by identifying body movements, including, but not limited to, hand gestures, a person turning their head, and the like. However, at or near the periphery 304 of the image detection area, small user movements or changes in position are in the subpixel domain, and therefore cannot be easily identified. Thus, in the periphery area 304 the image sensor and wide angle lens component can only function as a motion detector.

The goal of a lighting system in accordance with components and processes disclosed herein is to maintain nominal luminance of a light fixture or luminaire if one or more users are present or moving under that light fixture. When no user is in the proximity of a luminaire in the lighting system, then the controller of that luminaire controls the light level to gradually lower it in order to save energy. When a user approaches the luminaire, then the light output is increased up to the nominal value, and the process includes ensuring smooth transitions in illumination level to avoid disturbing lighting effects.

One possible realization of a simple control algorithm enabling the controller of a luminaire to regulate the power input to the light source is described below with reference to Equation 1:

$$P(t_{i+1}) = P(t_i)e^{-\frac{\Delta t}{\tau}} + \left(1 - \frac{r_{min}(t_i)}{r_{max}}\right)[P_n - P(t_i)] \quad (1)$$

Wherein:
$r_{min}(t_i)$ is the distance of the closest event measured from the center of the image at the time $t_i$.
$r_{max}$ is the distance between the image center and the boundary of the image (in the direction of closest event at $t_i$).
$P(t_i)$ is the power of the luminaire at time $t_i$.
$P_n$ is the nominal power of the luminaire.
$\tau$ is characteristic time for lowering luminance level, typically in the range of about one minute (1 min.) to about sixty minutes (60 mins.)
And wherein: $\Delta t = t_{i+1} - t_i$ Referring again to Equation 1, the first term after the equal sign decreases the power level when there is no event in the proximity of the luminaire at a particular time (i.e., there is no event occurring in the detection area). The second term after the equal sign increases the light output level, wherein the change in power level is relatively large if an event is detected at or near the center of the detection area and the actual power is significantly below the nominal power. The power increase and thus the light source output is relatively moderate if the event (user movement) is detected far away from the center of the detection area (for example, near the periphery). It should be understood, however, that other means can be utilized to modulate light source output levels such as using a shutter to decrease brightness and/or using a different or additional light source to increase brightness, which may or may not result in energy savings.

Figure 4:
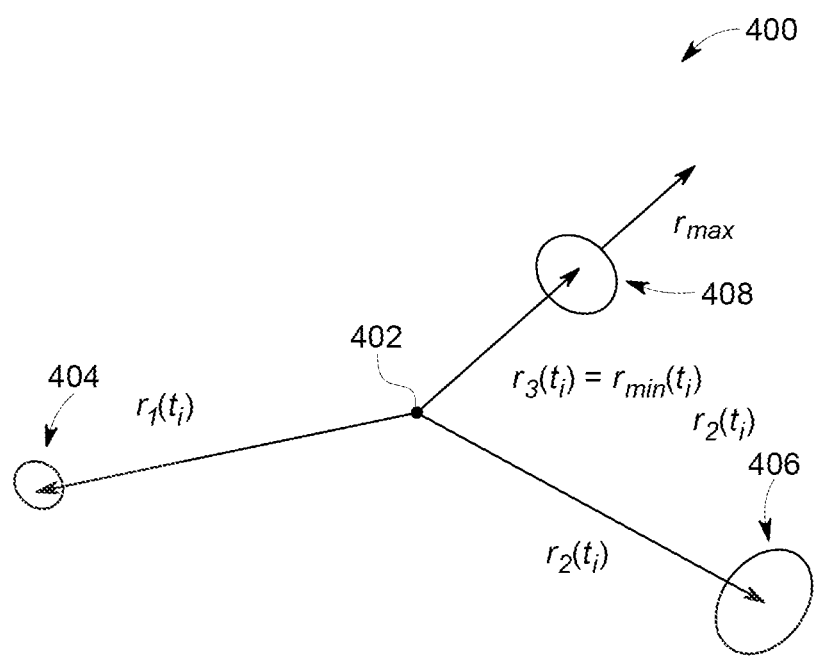
FIG. 4 graphically illustrates three events occurring simultaneously within a detection area of the luminaire of FIG. 1 which operates to detect the events and to adjust the light output in accordance with processes disclosed herein.

FIG. 4 is a graphical representation 400 illustrating three events occurring simultaneously within a detection area of a luminaire having an image sensor and wide angle lens component in accordance with the disclosure. The luminaire is configured to detect the events and to adjust the light output of the light source in accordance with processes described herein. In particular, a first event 404 is occurring at a distance $r_1$ from the image center 402 at a time a second event 406 is occurring at a distance $r_2$ from the image center 402 at the same time $t_i$, and a third event 408 is occurring at a distance $r_3$ from the image center 402 at the same time $t_i$. In some embodiments, the controller is optimized to recognize the event closest to the image center 402 and to adjust the input power level (and thus the illumination output) of the light source in accordance with that event. Thus, in some embodiments, when the change in distance ($\Delta r$) at the time $t_i$ is less than zero, then the equation controlling the power provided to the light sources is:

$$P(t_{i+1}) = \left(1 - \frac{r_{min}(t_i)}{r_{max}}\right)[P_n - P(t_i)] \times \frac{\Delta r(ti)}{\rho} \times \alpha$$

Wherein the change in distance relative to the light fixture or luminaire spacing of a plurality of luminaires of a lighting system is taken into account by the term $\Delta r(t_i)/\rho$. The rate of light changes can be adjusted by changing the factor $\alpha$ to meet specific user preferences. However, when the change in distance ($\Delta r$) of the events at the time $t_i$ is greater than zero, then the equation controlling the power provided to the light sources is:

$$P(t_{i+1}) = P(t_i)e^{-\frac{\Delta t}{\tau}}$$

Wherein $\Delta t$ is the sampling time, and $\tau$ is the decay time. Thus, in the case of multiple events the light output is correlated to the event closest to the center of the detection area and all other events are ignored or neglected.

In some situations a lighting system includes a plurality of luminaires that are (at certain times of the day) affected by natural light. Interior luminaires (for example, located within a classroom of a school building) may be located near one or more windows, and during daylight hours natural light entering through the windows can have a significant effect on the illuminance of the luminaires. In such situations, the controller in each luminaire must measure the illuminance (or light intensity) within its' detection area (for example, a generally circular area under a ceiling mounted lighting fixture) and proceed to adjust its' light output accordingly. Such operation is known as daylight harvesting, wherein the illuminance under the luminaire in the detection area can be measured (in some implementations) by the image sensor and wide angle lens component in conjunction with the controller. In some other embodiments, a dedicated light meter or light sensor may be used, which light sensor may be integrated within the luminaire. One possible realization of a daylight harvesting power control algorithm for use by the controller of a luminaire for controlling the power input to the light source, and thus the illumination level of the light source, is shown below in Equation 2:

$$P(t_{i+1}) = P(t_i)e^{-\frac{\Delta t}{\tau}} + \left(1 - \frac{L(t_i)}{L_n}\right)\left(1 - \frac{r_{min}(t_i)}{r_{max}}\right)[P_{max} - P(t_i)] \quad (2)$$

Wherein:
$L(t_i)$ is the illuminance under the luminaire at time $t_i$.
$L_n$ is the nominal (target) illuminance under the luminaire.

In a case wherein the actual illuminance, $L(t_i)$ exceeds the target luminance, $L_n$, then the power can be decreased to avoid over-illumination and conserve energy. In addition, at power switch On, Equation 2 may require auto-calibration, and in some embodiments the preferred starting value is $P(0)=P_n$–Full Power at switch On. In addition, to exclude cases wherein there is no light coming out of the luminaire, the minimum power value $P_{min}$ can also be set by replacing $P_{max}$ by $(P_{max}-P_{min})$ in Equation 1 and/or in Equation 2.

Accordingly, a lighting system consists of a plurality of luminaires that each include an image sensor and wide angle lens component in communication with a controller. Each luminaire acts independently, and the control algorithms ensure a smooth, optimized light distribution across the entire illumination space or area to avoid any abrupt or disturbing changes in lighting level. The light level for each luminaire may be set at a target value (or nominal illuminance or brightness value) when users are detected, and each controller is also operable to reduce or dim the light level when light is not needed.

In some embodiments, low bit rate communication can be established between a luminaire and a central management system by adding a communications component, such as a radio frequency (RF) transmitter, that is operably connected to the controller and/or to the image sensor and wide angle lens component. Thus, in an implementation, each luminaire of a plurality of luminaires can function to collect information regarding occupancy of surveillance areas, such as hallways, stairwells, building common areas, a building lobby, a rooftop, a parking area, a workspace and/or the like. In some implementations, the image sensor and wide angle lens components obtain data regarding the presence or motion of users in surveillance areas and transmit metadata to the central management system, while at the same time each image sensor and wide angle lens component operates in the manner described above to control the illuminance or light output of its luminaire. The central management system thus only receives motion detection data for processing, and does not control any of the luminaires. Such a surveillance system is therefore based on the image sensor and wide angle lens component controlled light fixtures described herein. Such light fixtures may be independently connected to a low bandwidth communication channel and may use the Digital Addressable Lighting Interface ("DALI") which is a data protocol and transport mechanism that was jointly developed and specified by several manufacturers of lighting equipment. The common platform of enables equipment from different manufacturers to be connected together. The light fixtures described herein therefore may forward any parameters (or combinations of thereof) used in Equation 1 or in Equation 2 (described above) to a central management system for further analysis. Such data from individual luminaires can be used to determine a distribution of events occurring over time, wherein such data is anonymous because the lighting control data cannot be used for face recognition purposes. Such event distribution data can be valuable to persons or entities, such as a facility manager or building management company, for applications beyond lighting applications such as, but not limited to, building applications concerning heating, ventilation, air conditioning, safety or security, crowd flow, and the like.

The disclosed lighting system solves the technological problem of how to provide a robust lighting system that does not require costly re-wiring, that saves energy, and that is highly reliable. In particular, significant energy savings can be realized in underutilized spaces (such as school auditoriums, hallways, and the like). In addition, in some embodiments of the disclosed lighting system the data captured by the image sensor and wide angle lens component of each luminaire may be transmitted to a central data management system and used for many purposes, such as for generating anonymous surveillance system data for safety and/or security purposes, while also providing integrated lighting control. In particular, there is no risk to privacy because no images are transmitted to a central management system, rather only metadata associated with user motion is provided to the central management system for processing (which may be useful, for example, for determining movement patterns and/or trends during certain times of day and the like).

It should be understood that the above descriptions and/or the accompanying drawings are not meant to imply a fixed order or sequence of steps for any process referred to herein. Thus, any disclosed process may be performed in any order that is practicable, including but not limited to simultaneous performance of one or more steps that are indicated as sequential.

Although the present invention has been described in connection with specific exemplary embodiments, it should be understood that various changes, substitutions, modifications and/or alterations apparent to those skilled in the art can be made to the disclosed embodiments without departing from the spirit and scope of the invention as set forth in the appended claims.

What is claimed is:

1. A lighting system for providing illumination to an area comprising a plurality of independent lighting fixture, each lighting fixture comprising:
    a controller;
    an image sensor and wide-angle lens component operably connected to the controller and having a viewing angle that covers a detection area encompassing an entire predefined space; and
    a light source operably connected to the controller;
    wherein the controller
        receives a detection signal data from the image sensor and wide-angle lens component when a user is within the predefined space,
        determines the position of the user from a center line associated with the light source based on the detection signal data, and
        controls the light source based on the position of the user to thus increase light source illuminance as the user approaches the center line and to decrease light source illuminance as the user moves away from the center line.

2. The lighting system of claim 1, wherein the controller controls the light source to gradually increase illuminance when the image sensor and wide angle lens component detects the presence of the user approaching a center portion of the detection area.

3. The lighting system of claim 2, wherein the controller controls the light source to increase illuminance to a maximum value when the image sensor and wide angle lens component detects the presence of the user at the center portion of the detection area.

4. The lighting system of claim 1, wherein the viewing angle of the image sensor and wide-angle lens component is in the range of from 100° to 175°.

5. The lighting system of claim 1, wherein the viewing angle of the image sensor and wide-angle lens component is in the range of from 160° to 175°.

6. The lighting system of claim 1, wherein the viewing angle of the image sensor and wide-angle lens component is 140°.

7. The lighting system of claim 1, wherein a sampling rate of the image sensor and wide-angle lens component and controller is greater than one Hertz.

8. A method for controlling illumination of an area comprising:
- monitoring, by a plurality of independent luminaires, a predefined area for a presence of at least one user, wherein each luminaire comprises:
  - a controller;
  - an image sensor and wide-angle lens component operably connected to the controller and having a viewing angle that covers a detection area encompassing the entire predefined area; and
  - a light source operably connected to the controller;
- detecting, by each of the plurality of independent luminaires, a user when the user is in the predefined area; and
- controlling, by each controller of the plurality of independent luminaires, the illuminance of its light source based on a detection signal data from its image sensor and wide-angle lens component,
- wherein when the detection signal data indicates that the user is approaching a center line associated with its light source of the luminaire the controller controls the light source to increase illuminance, and wherein when the detection signal data indicates that the user is moving away from the center line the controller controls the light source to decrease illuminance.

9. The method of claim 8, wherein controlling the illuminance of the light source further comprises gradually increasing, by the controller of the luminaire, the illuminance of the light source when the image sensor and wide angle lens component detects the presence of a user approaching the center line.

10. The method of claim 8, wherein controlling the illuminance of the light source further comprises increasing, by the controller of the luminaire, the illuminance of the light source to a maximum value when the image sensor and wide angle lens component detects the presence of the user at the center line.

11. The method of claim 8, wherein the image sensor and wide-angle lens component operates with the viewing angle in the range of from 160° to 175°.

12. The method of claim 8, wherein the image sensor and wide-angle lens component operates with the viewing angle in the range of from 160° to 175°.

13. The method of claim 8, wherein the image sensor and wide-angle lens component operates with the viewing angle of 165°.

14. The method of claim 8, wherein the image sensor and wide-angle lens component and controller operate with a sampling rate of greater than one Hertz.

* * * * *